(12) United States Patent
Llaurency

(10) Patent No.: US 7,885,292 B2
(45) Date of Patent: Feb. 8, 2011

(54) METHOD, SYSTEM, AND COMPUTER PROGRAM PRODUCT FOR DATA EXCHANGE

(75) Inventor: Sebastien Llaurency, Lunel (FR)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 12/367,904

(22) Filed: Feb. 9, 2009

(65) Prior Publication Data

US 2009/0201945 A1 Aug. 13, 2009

(30) Foreign Application Priority Data

Feb. 11, 2008 (EP) .................................. 08300080

(51) Int. Cl.
*H04J 3/22* (2006.01)
(52) U.S. Cl. ...................................... 370/466; 707/802
(58) Field of Classification Search ................. 370/466, 370/401; 707/756, 602, 761, 975, 809, 802; 709/223–226, 230–233
See application file for complete search history.

(56) References Cited

U.S. PATENT DOCUMENTS

| | | | | |
|---|---|---|---|---|
| 5,701,423 A * | 12/1997 | Crozier | ....................... | 715/762 |
| 5,778,373 A * | 7/1998 | Levy et al. | .................. | 707/748 |
| 6,243,715 B1 | 6/2001 | Bogantz et al. | | |
| 6,772,180 B1 * | 8/2004 | Li et al. | ...................... | 715/229 |
| 2004/0172635 A1 | 9/2004 | Watt | | |
| 2005/0064906 A1 * | 3/2005 | Metzler et al. | ............... | 455/560 |
| 2006/0253465 A1 * | 11/2006 | Willis et al. | .................. | 707/100 |
| 2006/0271519 A1 * | 11/2006 | Blackwood et al. | ............ | 707/3 |
| 2006/0282348 A1 * | 12/2006 | Greenfield et al. | ............ | 705/28 |
| 2007/0094392 A1 * | 4/2007 | Stone et al. | .................. | 709/225 |
| 2007/0255738 A1 * | 11/2007 | D'Costa | ...................... | 707/101 |
| 2008/0082589 A1 * | 4/2008 | English et al. | .............. | 707/203 |
| 2008/0189314 A1 * | 8/2008 | Reddy et al. | ................. | 707/102 |

FOREIGN PATENT DOCUMENTS

WO 05089350 A2 9/2005

* cited by examiner

*Primary Examiner*—Ricky Ngo
*Assistant Examiner*—Gary Mui
(74) *Attorney, Agent, or Firm*—Adam M. Steadman; Cynthia G. Seal

(57) ABSTRACT

A method, system, and computer program product are disclosed for exchanging data among data processing systems. The method may comprise transmitting a first data structure from an originating system in the format native to such system to a management component; identifying a target system for receiving the first data structure; transmitting the first data structure from the management component to an autonomous component as a function of the target system; and comparing the first data structure to a set of data templates in order to identify a matching data template. If a matching data template is identified, the method further may comprise generating a second data structure according to the matching data template in the format native to the target system. If no matching data template is identified, the method further may comprise generating a new data template and generating the second data structure according to the new data template.

21 Claims, 7 Drawing Sheets

METHOD, SYSTEM, AND COMPUTER PROGRAM PRODUCT FOR DATA EXCHANGE

RELATED APPLICATION

This application claims priority under 35 U.S.C. §119 to European Patent Application No. 08300080.2 filed Feb. 11, 2008, the entire text of which is specifically incorporated by reference herein.

FIELD OF THE INVENTION

The various embodiments described herein relate to a method and system for exchanging data relating to a given data environment among data processing systems, wherein such systems have different native data structure formats in terms of, e.g., specific operations and required input/output parameters.

BACKGROUND OF THE INVENTION

Due to recent advances in information technology and the spread of data networks, it is increasingly common and desirable for different systems to share or to transfer data among themselves. It is very often the case that different systems use different data structures to describe similar entities. In such case, in order for the data to be successfully exchanged, the data must at some point be translated from the data structure of the first entity to that of the second. FIG. 1 shows a conventional prior art solution. As shown in FIG. 1, a first system 110, a second system 120, and a third system 130 are provided, each system having its own native data structure for describing a given entity. In a case where it is necessary for each system to send data to and receive data from each of the other systems, the prior art solution is to provide each system with the capability of formulating data transmissions according to the data structure of the intended destination system. Thus, as shown in FIG. 1, the first system 110 is provided with a converter 111 for formulating transmissions in the data structure format of the second system 120 and also is provided with a converter 112 for formulating transmissions in the data structure format of the third system 130. Similarly, the second system 120 is provided with a converter 121 for formulating transmissions in the data structure format of the first system 110 and also is provided with a converter 122 for formulating transmissions in the data structure format of the third system 130. Furthermore, the third system 130 is provided with a converter 131 for formulating transmissions in the data structure format of the first system 110 and also is provided with a converter 132 for formulating transmissions in the data structure format of the second system 120. While in the simple three-system environment shown in FIG. 1 the described approach is not unduly onerous, it will be appreciated by one skilled in the art that the number of converter modules 111, 112, 121, 122, 131, 132 is equal to n(n−1), where n is the number of systems. Thus, with an increasing number of systems, the number of converter modules quickly may become unmanageable. Furthermore, the converter modules intended to generate data structures in the format suited to one particular system are distributed among all of the other systems, and accordingly there is a considerable maintenance burden in terms of updating converter modules to reflect changes in the data structure used by a particular system.

Alternative approaches may entail providing each system with a converter module able to receive data according to the data structure of another system, and to convert it into the structure of the local system. However, this approach is the exact reverse of that described with respect to FIG. 1 and thus is susceptible to all of the same drawbacks.

An Enterprise Service Bus (ESB) is a flexible connectivity infrastructure for integrating applications and services. An ESB can power Services Oriented Architecture (SOA) by reducing the number, size, and complexity of interfaces between applications and services. An ESB infrastructure routes messages between services, converts transport protocols between requester and service, transforms message formats between requester and service, and handles business events from disparate sources.

An ESB can simplify the IT infrastructure required to connect programs together. An ESB can make it possible to add new services or make changes to existing services with little or no impact to the use of existing services. While the various embodiments described herein are similar to an ESB infrastructure in various ways, the various embodiments provide capabilities that are not available with an ESB infrastructure.

SUMMARY OF THE INVENTION

According to the various embodiments described herein, a method and system are provided for exchanging data relating to a given data environment among data processing systems, wherein each data processing system has a respective native data structure format. Such system and method are defined in the appended independent claims and are discussed in detail in the detailed description herein. Further exemplary embodiments are defined in the appended dependent claims.

The various embodiments may allow more flexibility between existing applications and a provisioning mechanism. The various embodiments are focused on making the deployment and integration of a provisioning mechanism with any existing application simpler and faster.

The various embodiments described herein can effectively handle instructions according to various data structures adapted for distinct systems. Moreover, the various embodiments provide at least a three-layered structure of one or more operations, with each operation comprising a number of parameters and each parameter being defined in terms of values.

Further advantages of the various embodiments described herein will become clear to the skilled person upon examination of the drawings and detailed description. It is intended that any additional advantages be incorporated herein.

BRIEF DESCRIPTION OF THE DRAWINGS

The various embodiments will now be described by way of example with reference to the accompanying drawings, in which like references denote similar elements, and in which.

DETAILED DESCRIPTION

The various embodiments described herein bear some similarities to the Enterprise Service Bus (ESB), which is a web service oriented as described above. One having ordinary skill in the art will appreciate, however, that the ESB has certain intrinsic limitations that make it incapable of use in certain technical situations. For example, on an ESB, a mapping can be done using a mediation object, but not at multiple levels as described with respect to the various embodiments herein. The central conversion system described herein may interact with an ESB to maintain high flexibility but also may be dedicated to complex operations such as three-level mapping.

Figure 2:
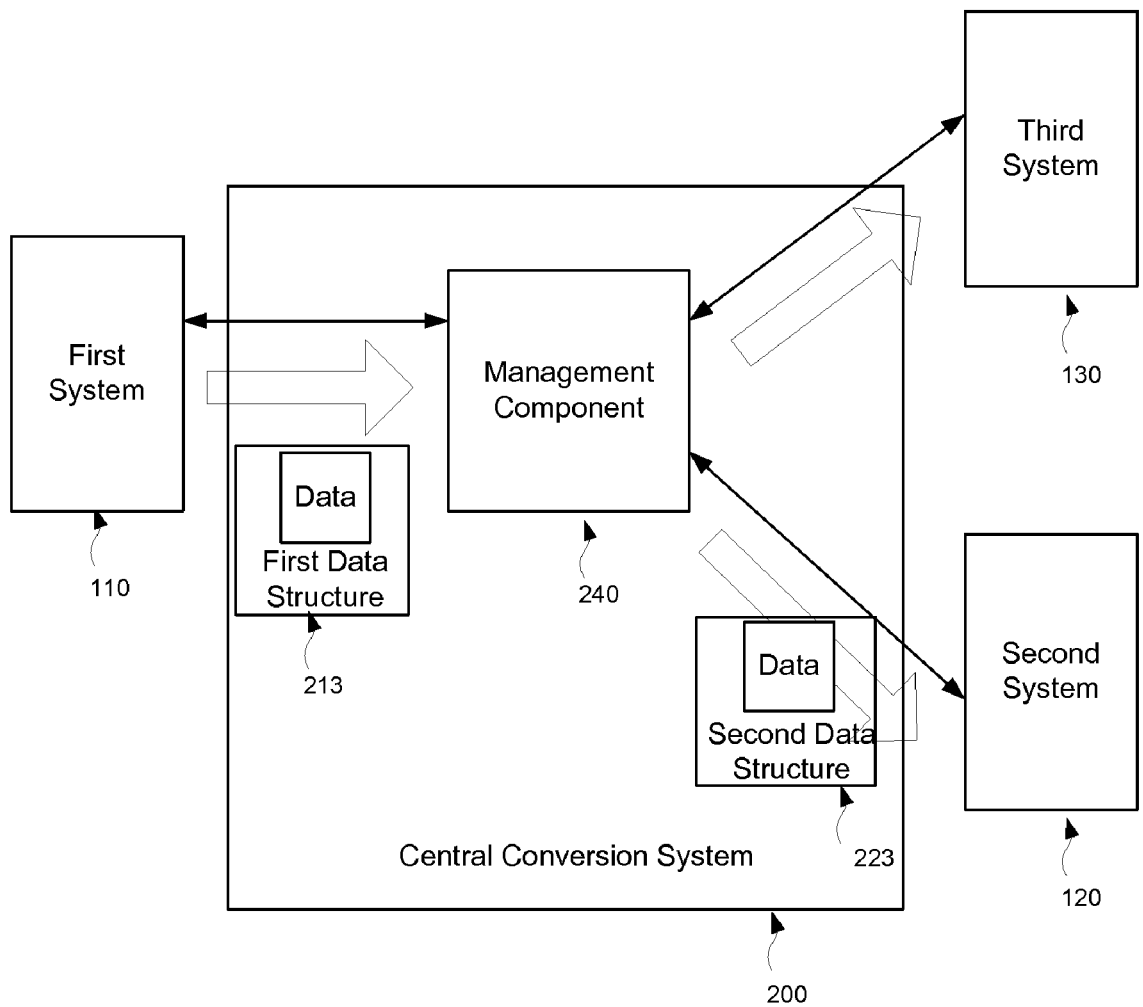
FIG. 2 provides an exemplary embodiment of a system for exchanging data among data processing systems, each data processing system having a respective native data structure format.

FIG. 2 provides an exemplary embodiment of a system for exchanging data among data processing systems, each data processing system having a respective native data structure format. By way of example, an operation to define a server is considered. Such operation may contain a number of parameters relating to, e.g., installed software, network resources and configuration, storage resources, hardware aspects such as processor type, RAM, HDD, RAID controller, a number of LAN cards, etc. Each of these parameters then may be specified by an associated value.

Particular difficulties with respect to data exchange occur not only when the names for different operations, parameters, and values are used in different systems, but also when the underlying data structure differs.

Thus, in an exemplary embodiment, the data at issue may be complex, and the various data structures each may define operations, the parameters associated with such operations, and a value associated with each said parameter. For example, one may envisage a server provisioning system for specifying computer systems.

Suppose that there is an originating system that provides a user interface for the definition of a required server and is to transmit instructions regarding such required server to a target (i.e., receiving) system. For the present example, it may be assumed that the first system 110 is such originating system. The first system 110 may generate a first data structure 213 comprising a three-layered structure of one or more operations, with each operation comprising a number of parameters and each parameter being defined in terms of values. An example of an operation having such three-layered structure is the following:

| Operation - CreateServiceA: | |
|---|---|
| Parameter: Values: | CPUQuantity |
| 1. | 1 |
| 2. | 2 |
| 3. | 3 |

| -continued | |
|---|---|
| Operation - CreateServiceA: | |
| Parameter: Values: | Memory |
| 1. | 256 GB |
| 2. | 512 GB |
| 3. | 1024 GB |
| Parameter: Values: | OperatingSystem (OS) |
| 1. | Windows XP |
| 2. | Windows Vista |
| 3. | Linux |
| 4. | AIX |

Naturally, the above parameters may be added to and/or elaborated upon as necessary without limit.

Such parameters of the first data structure 213 generally will not correspond in a one-to-one relationship to the parameters defined for the target system. For the present example, it may be assumed that the second system 120 is the target system responsible for receiving instructions defining a server and implementing the instructions so as to generate a server with the specified characteristics. The instructions may assume the form of a second data structure 223, which may be based, e.g., on the following parameters:

Parameter: HostPlatformID,

Parameter: ServerTemplateID

Parameter: Name

Figure 7:
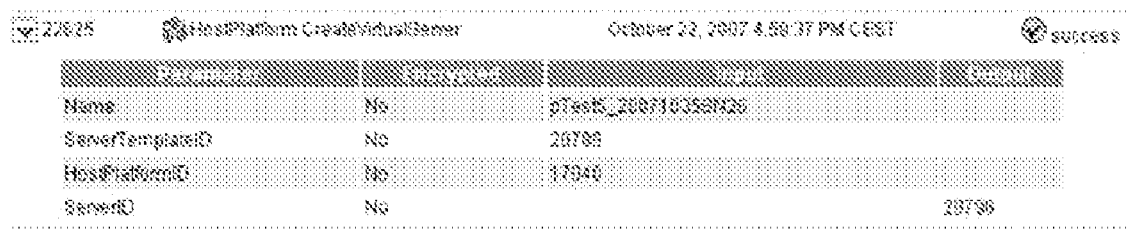
FIG. 7 provides an exemplary interface of a target data processing system receiving data from an originating data processing system.

More specifically, such parameters may be involved in an operation "HostPlatform.CreateVirtualServer", which is further described herein with respect to FIG. 7. Each parameter may have a large number of reference codes as possible values without any obvious human-discernable meaning.

Figure 1:
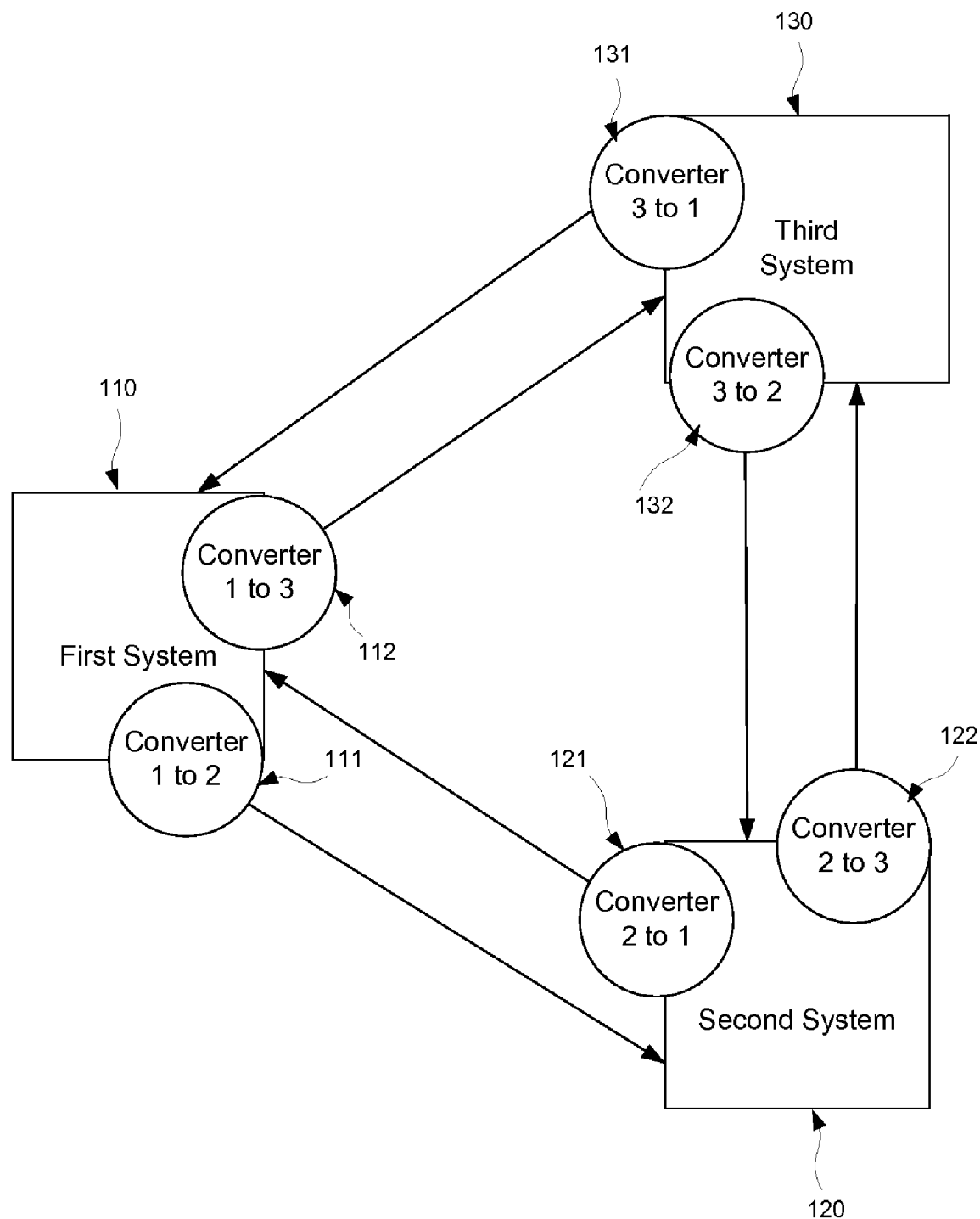
FIG. 1 provides a conventional prior art solution.

According to the prior art approach described with reference to FIG. 1, the translation of the first data structure 213 into the second data structure 223 is the task of the converter 111. However, according to the present exemplary embodiment, the translation of the first data structure 213 into the second data structure 223 may be carried out by a central conversion system 200, and more particularly via a management component 240 thereof. As will be described in detail herein, such translation may involve three-level mapping.

Figure 3:
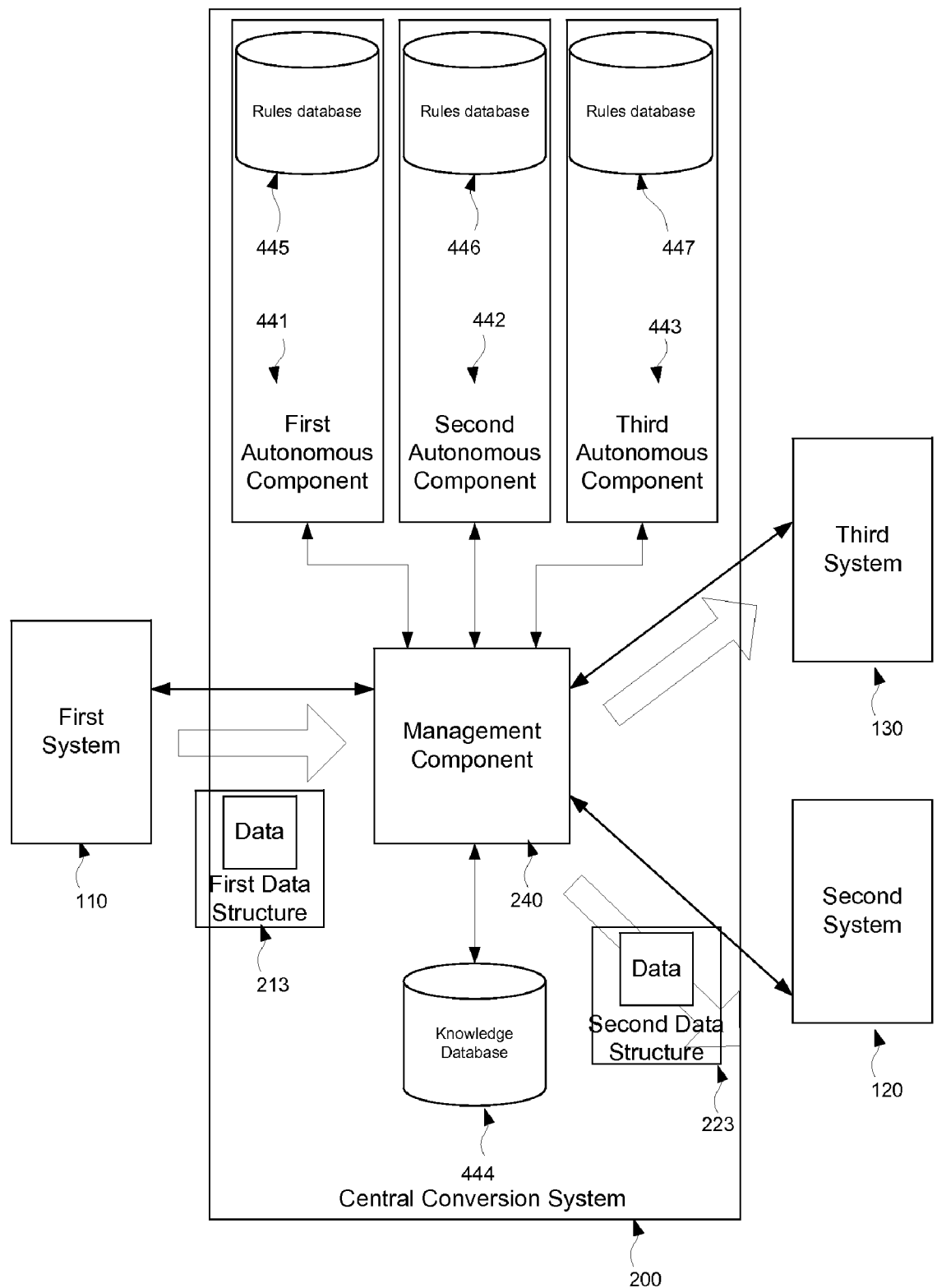
FIG. 3 provides further details of a central conversion system in the context of the exemplary embodiment described with reference to FIG. 2.

FIG. 3 illustrates further details of the central conversion system 200 in the context of the system illustrated in FIG. 2. As shown in FIG. 3, the central conversion system 200 further may comprise a knowledge database 444 and a number of autonomous components 441, 442, and 443, which may function as autonomic computing (AC) agents (note that the first autonomous component 441 may be referred to as AC1, the second autonomous component may be referred to as AC2, etc.). The autonomous components 441, 442, and 443 each may comprise respective rules databases 445, 446, and 447 that correspond to the data structure of each respective system 110, 120, and 130. The rules databases 445, 446, and 447 each may comprise sets of data templates and may also comprise rules regarding the use of such data templates.

That is to say, an autonomous component may be provided for each system, to which data might be sent, and such autonomous component may comprise a set of data templates for such system. The knowledge database 444 may comprise information necessary to determine the target system of a particular incoming data structure and to route it to the appropriate autonomous component accordingly. A sequence of autonomous components may be used for a particular incoming data structure in certain cases. For example, an autonomous component may serve as a "specialized" autonomous component in the event that the autonomous component to which an incoming data structure is routed does not have a necessary data template; such scenario is further described herein with reference to FIGS. 5 and 8.

To select an autonomous component (or sequence of autonomous components), a request may arrive at the management component 240 of the central conversion system 200. On the basis of a main criterion, "mapping type", the request may be sent to an appropriate autonomous component. The criterion "mapping type" in the context of IT infrastructure may be analogous to transportation categories, e.g., plane, train, car, boat, etc. In addition, the criterion "mapping type" may be different depending on an enterprise's organization and the conversion required from one system (e.g., the first system 110) to another system (e.g., the second system 120).

In the present example, the knowledge database 444 may comprise information regarding values of "servers" in the first system 110 and their mapping type. The management component 240 may have knowledge regarding a predetermined sequence of autonomous components that may be used given a particular incoming data structure; it may retrieve such knowledge from the knowledge database 444. Specifically, such knowledge may be reflected in table entries stored in the knowledge database 444, as shown in the following exemplary tables in the context of a provisioning system:

| IDTable1 | ServerName | Mapping Type |
|---|---|---|
| 1 | ServerA | System_x_A |
| 2 | ServerB | System_p_A |
| 3 | NetworkA | Admin350 |
| 4 | StorageA | DS6000_A |
| 5 | ServerC | System_x_A |
| 6 | ServerD | System_x_B |

| IDTable2 | Mapping Type | Entry System | Target System | AC Sequence |
|---|---|---|---|---|
| 11 | System_x_A | WebApplication1 | Provisioning_Manager_A 5.1 | AC1, AC3, AC2 |
| 12 | System_p_A | WebApplication1 | Provisioning_Manager_B 3.1 | AC1, AC2 |
| 13 | Admin350 | WebApplication1 | Provisioning_Manager_C 5.1 | AC2, AC3 |
| 14 | DS6000_A | WebApplication1 | Provisioning_Manager_A 5.1 | AC3 |

Figure 8:
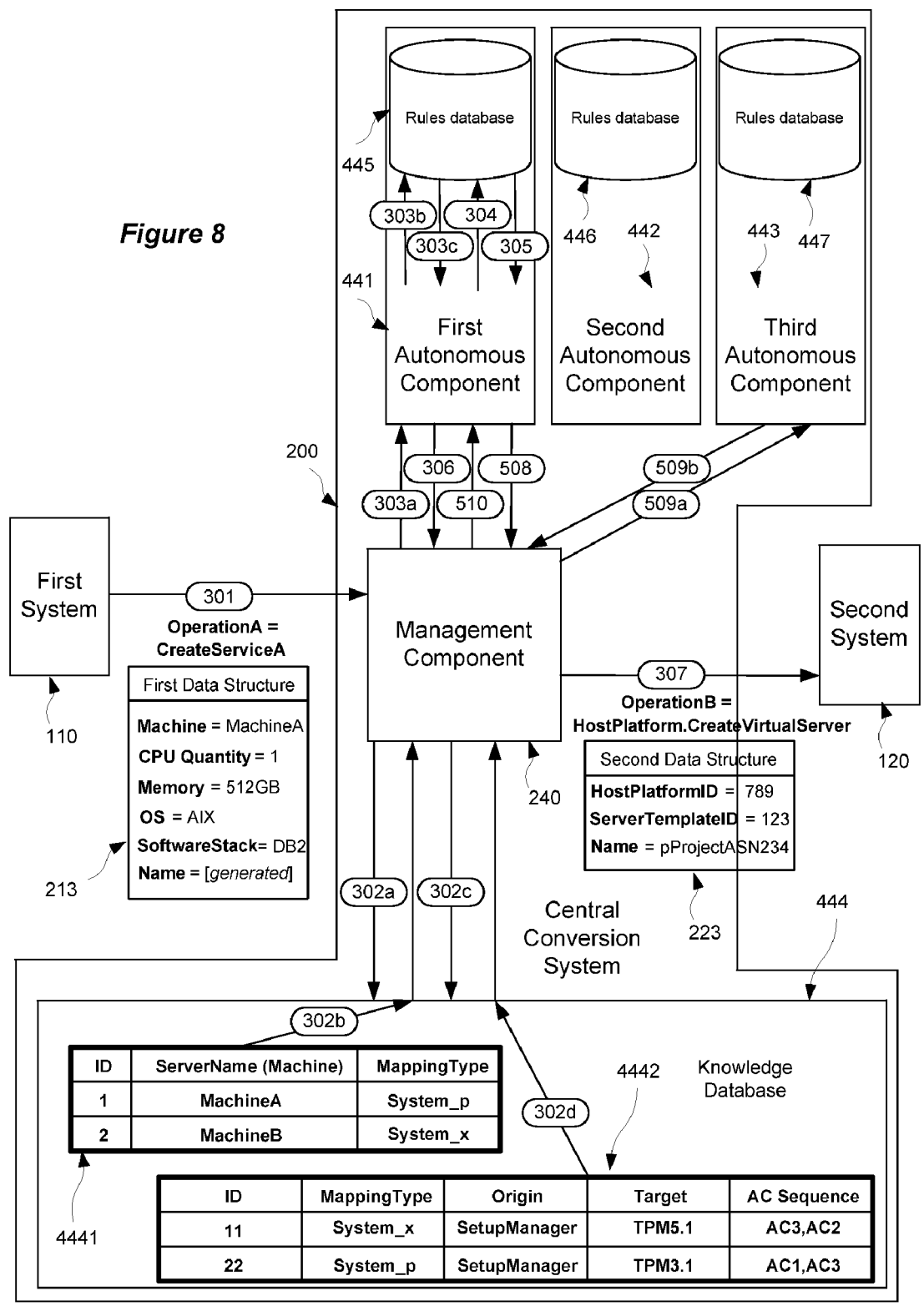
FIG. 8 provides an illustration with respect to an example further detailing the exemplary embodiments described with reference to FIGS. 3 and 5.

The selection of the autonomous component (or sequence of autonomous components) required for processing an operation is further discussed herein with reference to FIG. 8.

The function of the central conversion system 200 may be understood as carrying out operations on vectors of variable parameters and predefined parameters in order to translate generic information into specific information for a particular system or even another application. Such operations may be able to affect methods, parameters, and identities. This may be implemented by means of existing standards based on service-oriented architecture (SOA) and business process execution language (BPEL) technology. The central conversion system 200 of a module may be integrated into various SOA architectures to link the business layer with the infrastructure layer. The central conversion system 200 may interact with a management information system using its reconciliation functions.

Figure 4:
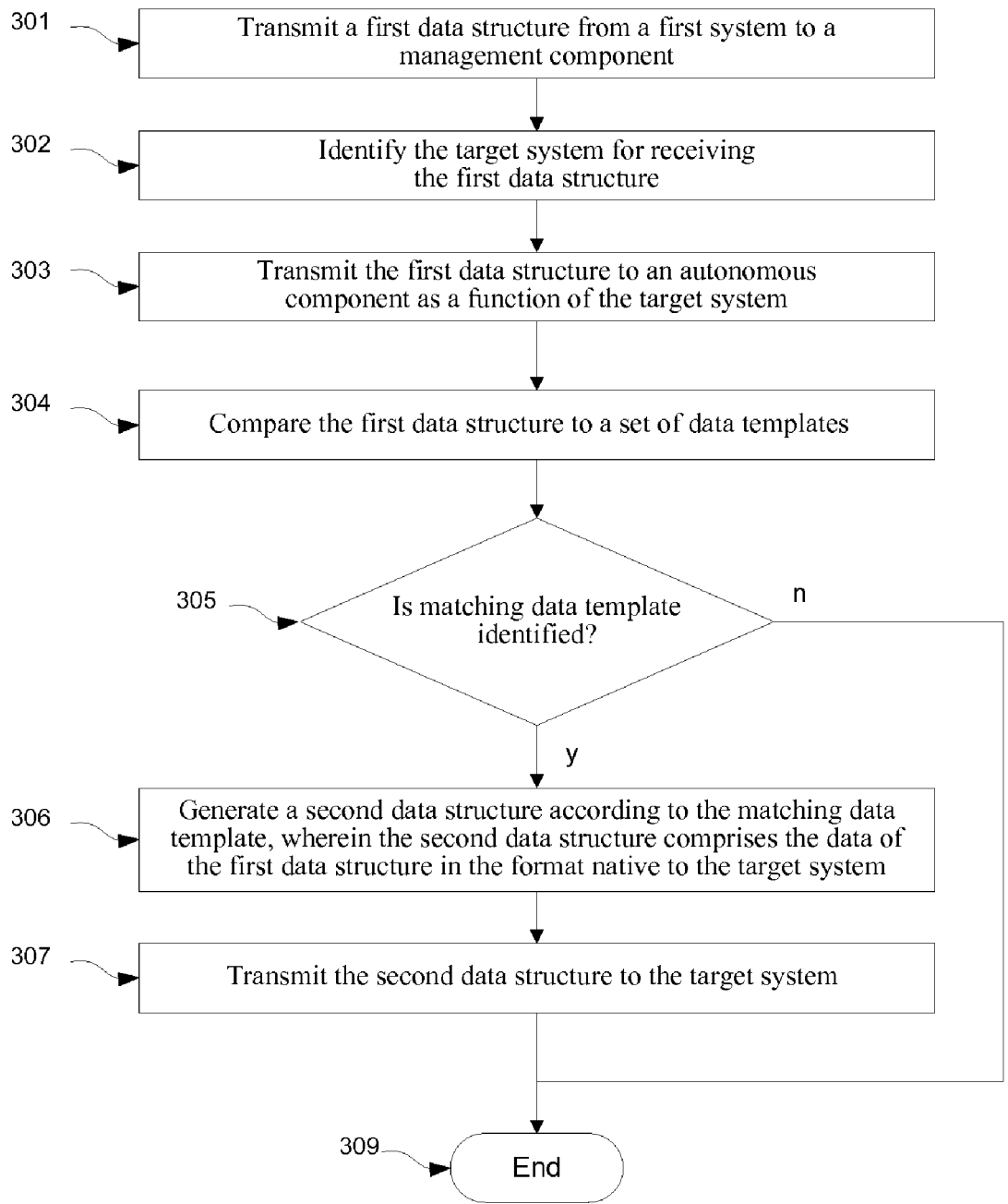
FIG. 4 provides an exemplary embodiment of a method for exchanging data among data processing systems, each data processing system having a respective native data structure format.

FIG. 4 provides an exemplary embodiment of a method for exchanging data among data processing systems, each data processing system having a respective native data structure format. Such method begins with step 301, in which the first data structure 213 may be transmitted from the originating system, which is the first system 110, to the management component 240 in the format native to the first system 110. Upon receipt of the first data structure 213, in step 302 the management component 240 may identify the target system for receiving the first data structure 213, which in the present example is the second system 120. Then, in step 303 the management component 240 may pass the first data structure 213 to an autonomous component as a function of the target system, which in the present example is the second system 120. More specifically, the management component 240 may determine with reference to the knowledge database 444 that the first data structure 213 is intended for the second system 120 and accordingly may forward the first data structure 213 to the second autonomous component 442, which may comprise the set of data templates for the second system 120. Subsequently, in step 304 the second autonomous component 442 may compare the first data structure 213 to the set of data templates in the rules database 446 of the second autonomous component 442. If in step 305 no matching data template is identified, then the process may end (step 309).

Conversely, if in step 305 a matching data template is identified, then in step 306 the second autonomous component 442 may generate a second data structure 223 according to the matching data template, wherein the second data structure 223 comprises the data of said first data structure in the format native to the second (target) system 120. Then, in step 307 the second data structure 223 may be transmitted to the second (target) system 120. More specifically, the second autonomous component 442 may transmit the second data structure 223 to the management component 240, and the management component 240 in turn may transmit the second data structure 223 to the second (target) system 120. Finally, the process may end (step 309).

Figure 5:
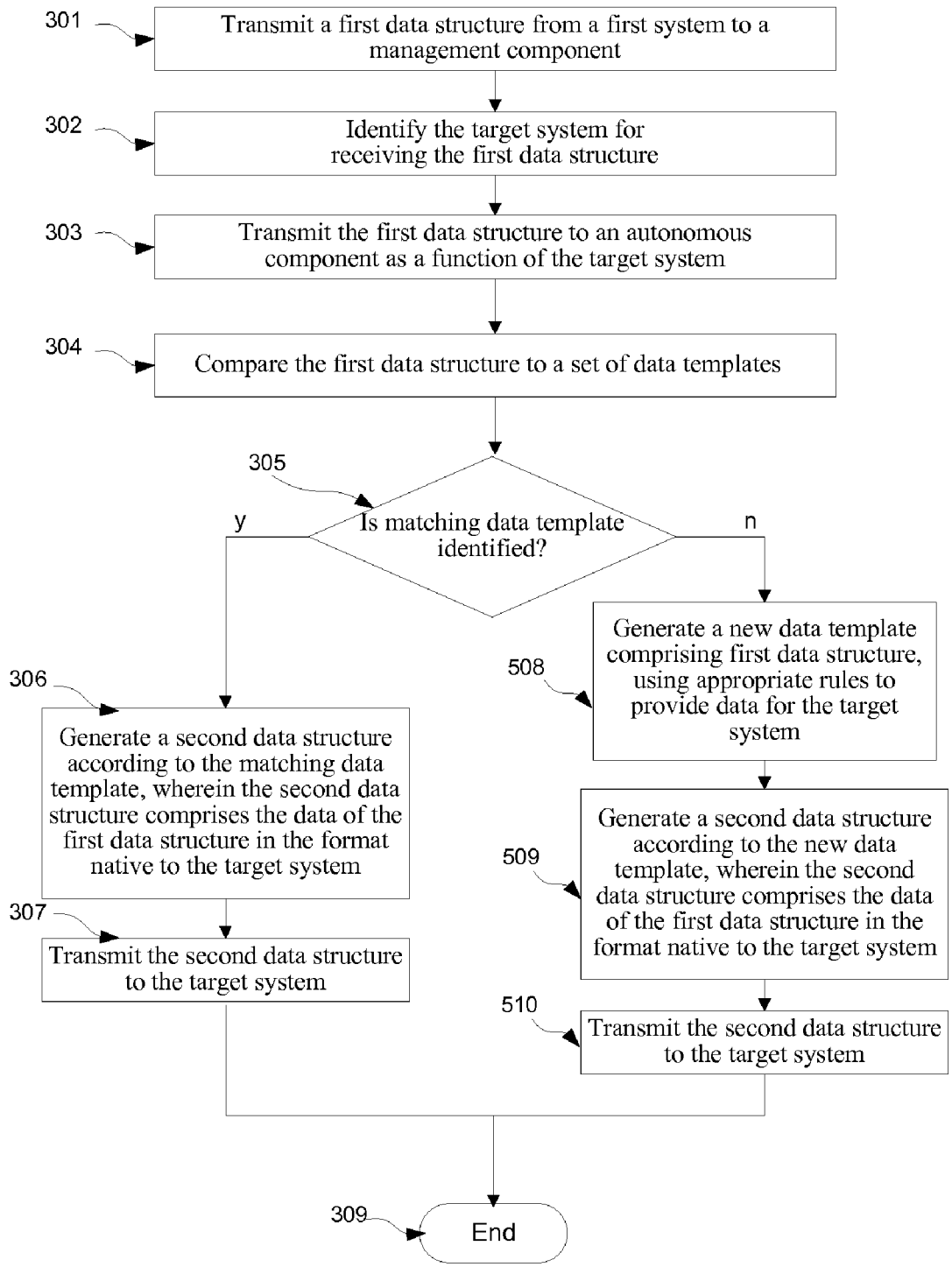
FIG. 5 provides a further development of the method described with reference to FIG. 4.

FIG. 5 illustrates a further development of the method referenced in FIG. 4. As shown in FIG. 5, if in step 305 the second autonomous component 442 fails to identify a data template matching the first data structure 213, then in step 508 a new data template may be generated to account for the first data structure 213 using appropriate rules to provide data for the target system, which in the present example is the second system 120.

The new data template generation process in step 508 may use information passed in the first data structure 213. The second autonomous component 442 may return a notification to the management component 240 that a new data template with a ServerTemplateID needs to be generated, and accordingly the management component 240 may call an operation (e.g., "generateTemplate") to generate a new data template with respect to the second (target) system 120. One alternative for new template generation may entail the second autonomous component 442 generating the new data template itself, using appropriate rules to provide data for the second (target) system 120. In another alternative, the management component 240 may solicit another autonomous component (i.e., a "specialized" autonomous component, such as the first autonomous component 441 or the third autonomous component 443) dedicated to the function of generating the new template. The management component 240 knows the target system (the second system 120), and with such knowledge it may provide the specialized autonomous component with the first data structure 213. The specialized autonomous component may convert the provided information into a third data structure comprising new template information, using appropriate rules to provide data for the second (target) system 120. Such conversion may be done using a combination matrix as described herein with reference to FIG. 6. Then, the third data structure may be provided to the management component 240. Subsequently, the management component 240 may transmit the new template information to the second autonomous component 442, and the rules database 446 may be filled with the new template information. Then, the management component 240 may request that the second autonomous component 442 continue the initial request conversion. Accordingly, once the second autonomous component 442 is filled with the new template information, in step 509 the second autonomous component 442 may generate a second data structure 223 according to the new data template, wherein the second data structure 223 comprises the data of said first data structure in the format native to the second (target) system 120. Then, in step 510 the second data structure 223 may be transmitted to the second (target) system 120.

It is important to note that the exemplary embodiments referenced in FIGS. 4 and 5 are not limited in scope to a specific originating system, a specific target system, and/or specific autonomous components. Accordingly, these exemplary embodiments may apply with respect to any combination of originating system, target system, and autonomous components as necessary for a given situation.

Figure 6:
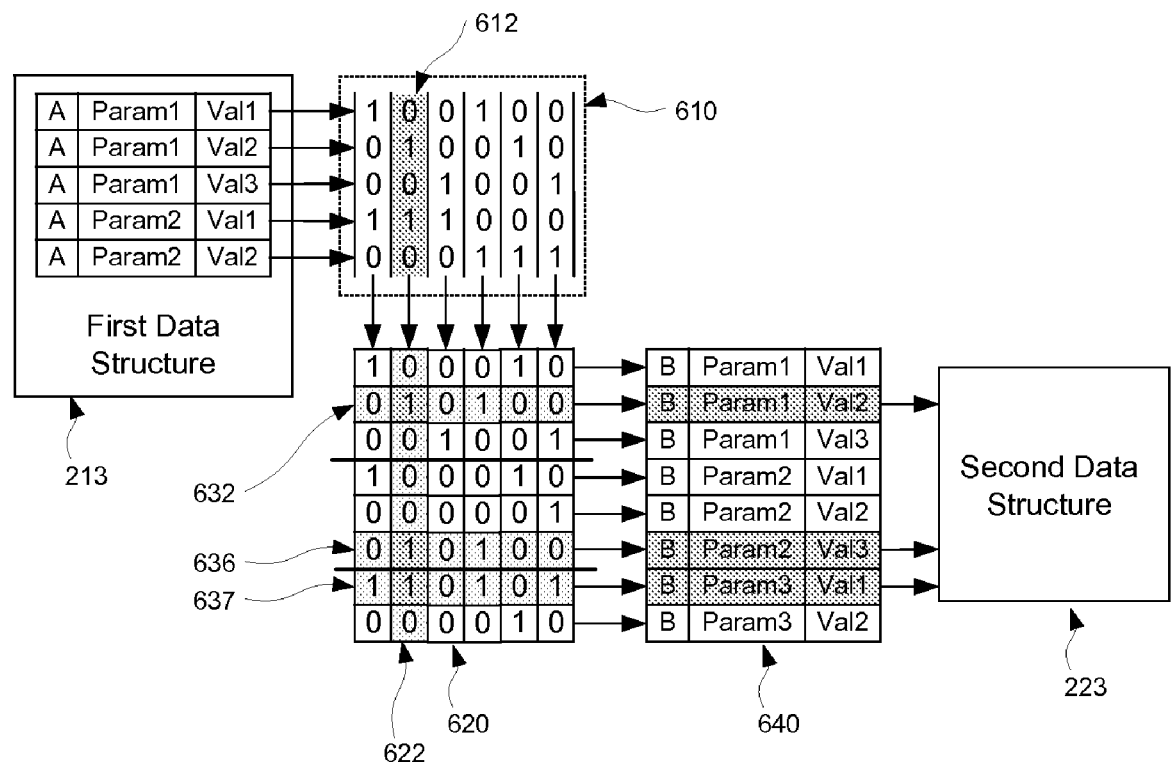
FIG. 6 provides an exemplary principle of operation for an autonomous component.

In order to better understand the operation of an autonomous component, an exemplary conversion of the first data structure 213 to the second data structure 223 (specifically, the conversion of the parameter values) on the basis of one possible implementation of the vector operation described above will now be described in detail. The rules for such conversion may be defined in a table stored in the appropriate rules database. FIG. 6 provides an exemplary principle of operation for an autonomous component performing such conversion. By way of example, this description will proceed in the context of the rules database 446 of the second autonomous component 442. As shown, the rules database 446 may implement a combination table 610, which may define various combinations of possible values associated with the different parameters, and such combinations may relate to various sets of output. As shown, the first data structure 213 may comprise two parameters. The first parameter (Param1) may have three possible values, and the second parameter (Param2) may have two possible values. If the first data structure 213 is received according to which the first parameter (Param1) is set to the second possible value (Param1, Val2), and the second parameter (Param2) is set to the first possible value (Param2, Val1), by consulting the columns of the combination table 610, in turn the second autonomous component 442 may detect that a second column 612 contains values corresponding to the first data structure 213. The second column 612 in the combination table 610 may be associated with a corresponding column 622 in a concordance table 620. Each row in the concordance table 620 may correspond to a respective row in a readout table 640.

As shown, certain rows in each column of the concordance table 620 have a value "1", while the remaining rows have a value "0". Considering the column 622, rows 632, 636, and 637 have a value of "1". According to an exemplary embodiment, a "1" in a particular row of the column under inspection may indicate that the data in the corresponding row of the readout table 640 is to be incorporated into the second data structure 223. Thus, combining the data from the rows 632, 636, and 637 of the concordance table 620 may produce a second data structure 223 fully representing the first data structure 213. The second data structure 223 then may be sent from the second autonomous component 442 to the management component 240 for transmission to the second (target) system 120 (e.g., in accordance with the method of FIG. 4).

Thus, according to the exemplary embodiment described with reference to FIG. 6, each column of the combination table 610 and its corresponding column in the concordance table 620, together with the referenced entries in the readout table 640, may constitute a data template.

FIG. 7 provides an exemplary interface of the second (target) system 120. The operation "HostPlatform.CreateVirtualServer" is shown, which takes as parameters "HostPlatformID", and "ServerTemplateID", and "Name", as mentioned above. Such operation and parameters may be sent to the second (target) system via the second data structure 223. The translation of the operation sent from the first (originating) system 110 via the first data structure 213 to the operation to be sent to the second (target) system 120 via the second data structure 223 will now be described in further detail by way of example.

Suppose that in a given example the first data structure 213 comprises an operation CreateServiceA(MachineA, 2, 1024 GB, AIX, DB2, MachineName), wherein "MachineA" is the value for a "Machine" parameter, "2" is the value for a "CPUQuantity" parameter, "1024 GB" is the value for a "Memory" parameter, "AIX" is the value for an "OperatingSystem" ("OS") parameter, and "DB2" is the value for a "SoftwareStack" parameter. The value for the "MachineName" parameter may be generated (note that the above value is italicized to indicate that it may be generated). In accordance with the first data structure 213 of the first system 110, the components of such operation may be encoded as shown below:

| Parameter: | Machine |
| Value: | MachineA |
| Code: | 1 0 1 0 1 |
| Parameter: | CPUQuantity |
| Value: | 2 |
| Code: | 1 1 0 1 0 |
| Parameter: | Memory |
| Value: | 1024 GB |
| Code: | 1 1 0 1 0 |
| Parameter: | OperatingSystem (OS) |
| Value: | AIX |
| Code: | 1 0 1 0 0 |
| Parameter: | SoftwareStack |
| Value: | DB2 |
| Code: | 1 0 0 0 1 |
| Parameter: | MachineName |
| Value: | [Generated] |
| Code: | n/a |

There may be four types of parameters: mapped, constant, generated, or result. Regarding the binary code values above provided for each parameter, a part of such code value may express the value of the parameter (e.g., a number or type), while the other part of such code value may express one or several characteristics of the parameter.

For a constant parameter, if no mapping definition exists and if the parameter name does not designate a generated or result parameter, then it is a constant parameter. For constant parameters, the name is the value.

For mapped parameters (e.g., "Machine", "CPUQuantity", "Memory", "OS", and "SoftwareStack" in the table above), the parameter name is the resource instance or resource template property where the information must be taken. The mappings map the value of this property to the value that will be sent to a provisioning mechanism (e.g., Tivoli Provisioning Manager (TPM)).

For generated parameters (e.g., "MachineName" in the table above), the provisioning mechanism waits for a unique value naming the entity provisioned.

For result parameters, their value is taken from the result (i.e., return) of a previous workflow or command (see, e.g., the "HostPlatformID", "ServerTemplateID", and "Name" parameters associated with the second data structure 223 and described herein with respect to FIG. 8).

Both the value, as indicated in the ServerTemplateID, and the type of resource required by the original request reflected by the operation in the first data structure 213 may be provided. The task flow and tables enabling the accomplishment of such tasks are described further herein in the description provided with reference to FIG. 8.

According to various exemplary embodiments, the target system of an incoming first data structure 213 may be specified in the data structure itself. For instance, two classes of server machines may be available, p type and x type, and each class of server machine may have its own provisioning system. Given such a scenario, the second system 120 may handle the provisioning of p type servers, while the third system 130 may handle the provisioning of x type servers. Since the target system may be specified in the first data structure 213, upon receipt of the first data structure 213, the management component 240 may determine whether the first data structure 213 relates to the provisioning of p type servers or the provisioning of x type servers. Accordingly, as described immediately below, the "mapping type" corresponding to the first data structure 213 may be determined based on one or more components of the first data structure 213 (e.g., the parameters of the operation "CreateServiceA"), and consequently translation of the first data structure 213 to the second data structure 223 via three-level mapping may be performed.

Translation from the first data structure 213 to the second data structure 223 via three-level mapping according to an exemplary embodiment may be performed as follows. The mapping for the operation and parameter names of the first data structure 213 to the second data structure 223 may be performed at the management component 240 using the knowledge database 444 and rules information. The incoming operation needs to be defined previously in a rules engine of the management component 240. An administrator may have a way to define in a simple manner the mapping rules in the knowledge database 444 via an admin interface. Mapping type identification may be based on the key parameter of the "CreateServiceA" operation parameters within the first data structure 213. In the present example, the key parameter is "Machine" (value="MachineA"). The management component 240 may consult the knowledge database 444 and may obtain the associated "mapping type" based on such key parameter. The knowledge database may contain a table such as the following:

| ID | ServerName (Machine) | MappingType |
|----|----------------------|-------------|
| 1  | MachineA             | System_p    |
| 2  | MachineB             | System_x    |

According to the above table, it may be determined that the "MachineA" parameter value in the present example corresponds to the "System_p" mapping type (note that this table is also described herein as table 4441 with reference to FIG. 8). Based on the mapping type, the management component 240 may consult an appropriate table to retrieve information on the target system and the autonomous component or sequence of autonomous components through which to proceed (see, e.g., the autonomous component designation in the dispatch table below in the context of the present example, or the autonomous component sequence designation in table 4442 in the context of the description herein with reference to FIG. 8). Consequently, in accordance with step 302 of the method described above with reference to FIGS. 4 and 5, the management component 240 may identify and obtain information regarding the target system, which in the present example is the second system 120. Upon identification of the target system, the management component 240 may proceed to the first and second levels of mapping, which are the mapping of the operation name and the parameter names, respectively. The management table 240 may obtain the necessary mapping information from the knowledge database 444 or a rules database, depending on the implementation choice. As a result of the target system identification and the first and second level mapping, the management component 240 will know which autonomous component to call, the operation to call in the target system, and the parameter names to use in the called autonomous component for the third level of mapping, which is the mapping of the parameter values. Such third-level mapping may be in accordance with the method described above with reference to FIG. 6 and step 306 of FIGS. 4 and 5.

If an operation is not recognized (i.e., administrator has not adequately filled a relevant rules database or the knowledge database 444), the management component 240 may use an exception process to return an appropriate message to the first system 110.

Reference to the knowledge database 444 may reveal that the "CreateServiceA" operation and similar operations of this type are dispatched to the appropriate autonomous component as a function of the first component in the operation. Accordingly, the management component 240 may retrieve the first component code value "1 0 1 0 1" (which in the present example is the code value corresponding to the "Machine" parameter with value "MachineA"). A dispatch table to which the management component 240 may refer may be contained in the knowledge database 444. An example of such dispatch table is as follows:

| CreateServiceA | |
|----------------|---|
| Component Value | Autonomous Component |
| 1 0 0 0 1 | Second (442) |
| 1 0 1 0 1 | Second (442) |

-continued

| CreateServiceA | |
| --- | --- |
| Component Value | Autonomous Component |
| 1 0 0 1 1 | Third (443) |
| 0 1 1 0 1 | Second (442) |
| 0 0 1 0 1 | Third (443) |
| 0 1 1 0 1 | Second (442) |
| 0 1 1 1 1 | Third (443) |
| 0 1 1 0 0 | Third (443) |

Reference to the dispatch table in the knowledge database 444 as provided above reveals that "CreateServiceA" operations having the value "1 0 1 0 1" for the first component are to be routed to the second autonomous component 442, and the management component 240 may route the first data structure 213 accordingly.

Upon receipt at the second autonomous component 442, the first data structure 213 may be compared to the various data templates stored in the rules database 446 corresponding to the second system 120 in order to identify a data template that matches the code values of the parameters of the first data structure 213. An exemplary simplified table having a set of data templates is provided below, wherein each row may represent a data template, and wherein the code values of the first input column may be compared to the code value of the second component of the "CreateServiceA" operation of the first data structure 213 (corresponding to the "CPUQuantity" parameter); the code values of the second input column may be compared to the code value of the third component (corresponding to the "Memory" parameter); the code values of the third input column may be compared to the code value of the fourth component (corresponding to the "OS" parameter); and the code values of the fourth input column may be compared to the code value of the fifth component (corresponding to the "SoftwareStack" parameter):

20071035SN26,17040,20789,20796, thus providing the components of the second data structure 223 as required by the second system 120 for the HostPlatform.CreateVirtualServer operation. As indicated in FIG. 7, the parameters for this operation may include a "Name" parameter (indicating server name), a "HostPlatformID" parameter, and "ServerTemplateID" parameter, all of which may be inputs. Moreover, as mentioned above, there may be a "ServerID" output. The listing below provides the various parameters and their corresponding values from the matching data template:

| Parameter | Value |
| --- | --- |
| Name | pTest5_20071035SN26 |
| HostPlatformID | 17040 |
| ServerTemplateID | 20789 |
| ServerID (output) | 20796 |

If no matching data template is identified, the second autonomous component 442 may send a notification back to the management component 240 indicating that a ServerTemplateID for the "System_p" mapping type needs to be generated. The management component 240 may search the knowledge database 440 to retrieve a "specialized" autonomous component with the capability of generating the template for the "System_p" mapping type with the second system 120 as a target. Based on the action to take (generating a template), and the mapping type (System_p), the proper "GenerateTemplate" operation may be called by the "specialized" autonomous component to generate a new template with respect to the second (target) system 120, and the parameters provided to the "specialized" autonomous component for such operation may be a subset of the first data structure 213. Once the new data template is generated, the new combination of values may be added to the appropriate data template table of the rules database 446 in the second autonomous

| Data Templates for CreateServiceA operation with first component = 1 0 1 0 1 | | | | |
| --- | --- | --- | --- | --- |
| Input | | | | Output |
| 0 0 0 0 0 | 0 0 0 0 0 | 0 0 0 0 0 | 0 0 0 0 0 | |
| 0 0 0 0 0 | 0 0 0 0 0 | 0 0 0 0 0 | 0 0 0 0 1 | pTest1_20071013SN24, 14728, 95373, 24385 |
| ... | ... | ... | ... | |
| 1 1 0 1 0 | 1 0 0 0 0 | 1 0 1 0 0 | 0 1 1 1 0 | pTest5_20071035SN26, 43861, 14327, 01497 |
| 1 1 0 1 0 | 1 0 0 0 0 | 1 0 1 0 0 | 0 1 1 1 1 | |
| 1 1 0 1 0 | 1 0 0 0 0 | 1 0 1 0 0 | 1 0 0 0 0 | pTest4_20071022SN81, 10486, 01451, 09457 |
| ... | ... | ... | ... | |
| 1 1 0 1 0 | 1 1 0 1 0 | 1 0 1 0 0 | 1 0 0 0 1 | pTest5_20071035SN26, 17040, 20789, 20796 |
| ... | ... | ... | ... | ... |
| 1 1 1 1 1 | 1 1 1 1 1 | 1 1 1 1 1 | 1 1 1 1 1 | |

Accordingly, the identification of the appropriate data template may be carried out via a logical AND operation of the first data structure 213 with each data template.

In accordance with the present example, the server name may be generated automatically. "ServerID" is an output from the second system 120 that may be stored by an autonomous component for use in subsequent operations as necessary (see the "ServerID" parameter listed in FIG. 7).

By comparing the defined data templates one-by-one with the incoming first data structure 213, the second autonomous component eventually may identify the matching entry, which may define the second data structure 223. The matching data template entry above has an output ptest5_ component 442. An XML file may be filled in to dynamically generate the ServerTemplateID later. Generating a new template is also discussed herein with reference to FIGS. 5 and 8.

In some cases, a particular value may not be sufficient to unambiguously select a particular autonomous component. In such case, a number of different autonomous components could be called upon to determine which autonomous component is best able handle a particular incoming first data structure. For example, the first data structure 213 may be submitted to one autonomous component, which in turn may use a service (information) from another autonomous component (e.g., linked via workload manager) that would detect the best system on which to deploy the new request. This action may provide the best HostPlatformID to select for the second system 120 (e.g., in the case of the present example, a System p machine where few micro partitions (servers) are deployed).

The rules for the autonomous components may be declarative in order to be able to define any necessary mapping among different systems. For instance, a rule may be declared for mapping CreateServiceA(MachineA, 2, 1024, AIX, DB2, MachineName) to HostPlatform.CreateVirtualServer (20789, 17040, pTest5__20071035SN26).

In some cases, it may be appropriate to define translation rules that allow an autonomous component, in conjunction with the management component 240, to convert some or all of the first data structure 213 from the first (originating) system 110 into the second data structure 223 for the second (target) system 120. As shown below, the translation rules may account for the three levels of translation with respect to operations, parameters, and values. As discussed above, the level of translation between parameter values may be performed in the autonomous components, while the levels of translation between operation names and parameter names may be performed in the management component 240. It is important to note that the translation rules provided below are merely exemplary in nature. Accordingly, various other translation rules in addition to or in lieu of these translation rules may be used.

Exemplary Translation Rules: First System to Second System
  Level One Mapping (Operation Name Level):
    Map Operation A to Operation B (CreateServiceA to HostPlatform.CreateVirtualServer).
  Level Two Mapping (Parameter Name Level):
    Map (ParamA1, ParamA2, ParamA3, ParamA4, ParamA5, ParamA6) to (ParamB1, ParamB2, ParamB3), wherein
    (ParamA1, ParamA2, ParamA3, ParamA4, ParamA5, ParamA6):=(in MachineType, inout MachineName, in CPUQuantity, in Memory, in OperatingSystem, in SoftwareStack);
    (ParamB1, ParamB2, ParamB3):=(in HostPlatformID, in ServerTemplateID, in Name, inout ServerID).
  Level Three Mapping (Parameter Value Level):
    Map (ValueA1, ValueA2, ValueA3, ValueA4, ValueA5, ValueA6) to (ValueB1, ValueB2, ValueB3) as follows:
      AC Agent1 (for Servers): Map ValueA1 to ValueB1
      AC Agent3 (for ServerTemplate): Map ValueA1, ValueA3, ValueA4, ValueA5, ValueA6 to ValueB2;
      AC Agent2 (for Generated parameter): Map ValueA2 to ValueB3.

FIG. 8 provides an illustration with respect to an example further detailing the exemplary embodiments described with respect to FIGS. 3 and 5. It is important to note that the following description with respect to FIG. 8 uses different exemplary parameter values for the first data structure 213 than the description above with respect to FIG. 7; thus, the parameter values obtained for the second data structure 223 differ from the second data structure parameter values described above and illustrated in FIG. 7. For the example with respect to FIG. 8, the first data structure may comprise an operation CreateServiceA(MachineA, 1, 512 GB, AIX, DB2, MachineName), wherein "MachineA" is the value for the "Machine" parameter, "1" is the value for the "CPUQuantity" parameter, "512 GB" is the value for the "Memory" parameter, "AIX" is the value for the "OperatingSystem" ("OS") parameter, and "DB2" is the value for the "SoftwareStack" parameter. As previously mentioned, the value for the "MachineName" parameter may be generated. FIG. 8 shows a system corresponding substantially to that of FIG. 3, to which arrows have been added representing the various data transactions by means of which a method corresponding substantially to that of FIG. 5 may be realized. The data transactions are identified in FIG. 8 by encapsulated reference numerals that correspond to the steps described with respect to FIGS. 4 and 5. As shown, in transaction 301 the first (originating) system 110 may transmit the first data structure 213 to the management component 240. Transaction 302 then may ensue, which as shown may comprise four separate transactions. First, during transaction 302a, the management component 240 may request from the knowledge database 444 the mapping type for "MachineA" (as previously mentioned herein, "MachineA" is the value of the "Machine" parameter in the first data structure 213). The knowledge database 444 may comprise a table 4441 with the following information:

| ID | ServerName (Machine) | MappingType |
|----|----------------------|-------------|
| 1  | MachineA             | System_p    |
| 2  | MachineB             | System_x    |

From the table 4441, it may be determined that the mapping type for the parameter value "MachineA" is "System_p". Accordingly, the knowledge database 444 in transaction 302b may respond to the management component 240 by specifying that the requested mapping type is "System_p".

Next, in transaction 302c the management component 240 may request from the knowledge database 444 the appropriate autonomous component sequence for the mapping type "System_p". The knowledge database 444 may contain a table 4442 containing the following information indicating various predetermined autonomous component sequences as follows:

| ID | MappingType | Origin       | Target | AC Sequence |
|----|-------------|--------------|--------|-------------|
| 11 | System_x    | SetupManager | TPM5.1 | AC3, AC2    |
| 22 | System_p    | SetupManager | TPM3.1 | AC1, AC3    |

From the table 4442, it may be determined that the autonomous component sequence for the "System_p" mapping type entails consulting AC1 (the first autonomous component 441) and then AC3 (the third autonomous component 443) as appropriate. Accordingly, the knowledge database 444 in transaction 302d may respond to the management component 240 by specifying such autonomous component sequence.

The management component 240 then may proceed to consult the autonomous components as specified by the autonomous component sequence (which is consistent with step 303 as described with respect to FIGS. 4 and 5). Accordingly, the management component 240 first may consult the first autonomous component 441. In so doing, the management component 240 in transaction 303a may transmit the first data structure 213 to the first autonomous component 441, which may prompt the first autonomous component 441 to implement an internal transaction 303b to consult its rules database 445. Then, mapping may be carried out according to any of the approaches described herein. According to the present example, the consultation of the rules database 445 by the first autonomous component 441 may be broken down into substeps 303b1 and 303b2. In substep 303b1 mapping information may be selected, and in substep 303b2 parameter names and values may be translated into a binary code sequence.

More specifically, in substep 303b1 the selection of mapping information may be carried out with reference to tables such as the following:

| First System Operations | | | | | |
|---|---|---|---|---|---|
| OperationIdFirstSystem | OperationName | Param1 | Param2 | Param3 | Param4 |
| 21 | CreateServiceA | Name1 | Machine1 | CPU1 | mem1 |
| 22 | CreateServiceA | Name2 | Machine2 | CPU2 | mem2 |

| Second System Operations | | | | | |
|---|---|---|---|---|---|
| OperationIdSecondSystem | OperationName | Param1 | Param2 | Param3 | Param4 |
| 31 | HostPlatform.CreateVirtualServer | Name | HostPlatformID | ServerTemplateID | ServerID |

| AC1 Mapping Rule Database | | | |
|---|---|---|---|
| OperationIdFirstSystem | ParamFirstSystem | OperationIdSecondSystem | ParamSecondSystem |
| 21 | Param1 | 31 | Param1 |
| 21 | Param2 | 31 | Param2 |
| 21 | Param3 | 31 | Param3 |
| 21 | Param4 | 31 | Param4 |
| 21 | Param5 | 31 | Param5 |

With reference to the first system operations table, the appropriate operation may be selected, in this case operation 21. With reference to the second system operations table, the appropriate operation may be selected, in this case operation 31. The rules database 445 of the first autonomous component 441 may provide the rules for mapping an operation with id 21 in the first system 110 to id 31 in the second system 120.

In substep 303b2, the mapped parameter names and values may be translated into a binary code sequence in accordance with the mapping information selection carried out in substep 303b1. An exemplary translation to a binary code sequence is as follows:

| Parameter name | Values |
|---|---|
| Machine1 | 10101 => match for MachineA |
| CPU1 | 11001 => match for 1 CPU of System p |
| CPU2 | 11010 |
| CPU3 | 10011 |
| Memory | 11001 => match for 512 GB of memory |

Via transaction 303c, the complete results from the database queries may be returned in the following format reflecting the above matches:
Results:
10101
11001
11001

Subsequently, in transaction 304 the translated first data structure 213 may be compared to the data templates already known at the first autonomous component 441, with reference to a template table such as the following:

| Template Table | | | | | |
|---|---|---|---|---|---|
| TemplateID | CPU | Memory | Disk | nic | OS |
| 789 | 1 | 0 | 1 | 0 | 1 |
| 789 | 1 | 0 | 1 | 0 | 1 |
| 789 | 1 | 0 | 1 | 0 | 1 |
| 567 | 0 | 1 | 0 | 0 | 1 |
| 567 | 0 | 1 | 1 | 0 | 1 |
| 567 | 0 | 0 | 0 | 1 | 1 |
| 567 | 0 | 0 | 1 | 1 | 1 |

If no suitable data template is identified, then a mismatch notification message may be submitted to the management component 240 in transaction 508. The management component 240 may determine whether there is a server template to generate, a host to discover, or some other piece of missing information and may take appropriate action (see transactions 509a, 509b, and 510 described below). Once a suitable template becomes available, the process may resume.

Transaction 305 may involve using the matching data template (once it is identified) to return data components necessary for the second data structure 223.

Transaction 305 may be subdivided into three distinct subtransactions as follows:
　Transaction 305a: return ServerTemplateID=789
　Transaction 305b: return HostPlatformID=123
　Transaction 305c: return a generated Name On the basis of the information provided through transactions 303c and 305, the autonomous component 240 may provide the second data structure 223 for second system 120 to the management component 240 in transaction 306. Then, the management component 240 in transaction 307 may transmit the second data structure 223 to the second (target) system 120 using the second system format as follows: HostPlatform.CreateVirtualServer (HostPlatformID=789, ServerTemplateID=123, Name=pProjectASNxxx). The generated parameter value for the "Name" parameter as provided in FIG. 8 is "pProjectASN234".

According to certain exemplary embodiments, a "specialized" autonomous component may be provided that specializes in the generation of data templates. Such specialized component in the present example may be the third autonomous component 443 in accordance with autonomous component sequence previously provided to the management component 240 via transaction 302d. In a case in which an autonomous component returns a mismatch notification message as mentioned above with respect to transaction 508, in transaction 509a the management component 240 may call upon such specialized autonomous component to generate a new data template. To generate such new template, the specialized autonomous component may use a specific operation using the parameters of the first data structure 213. As previously suggested with respect to step 508 of the method illustrated in FIG. 5, such operation may entail using appropriate rules to provide data for the second (target) system 120. The necessary operation and mapping information may be held by the specialized autonomous component in its rules database (the rules database 447 in the present example).

The following operations may be used to generate the various parameter values for the second data structure 223:

For the parameter ServerTemplateID:
CreateVirtualServerTemplate(TemplateName, CPU, Memory, OS, SoftwareStack, . . . ), wherein the parameter values are from the data of the first data structure 213. The result from such operation call may be a unique ServerTemplateID.

For the parameter HostPlatformID:
DiscoverAndImportNewHost(MachineName). The result from such operation call may be a unique HostPlatformID.

For the parameter Name:
GenerateName(Keyword), wherein the keyword may be obtained from the first data structure 213, a rules database (e.g., the rules database 447), or the knowledge database 444. The result from such operation call may be a unique Name (server name).

The new data template resulting from the processing at the specialized autonomous component (the third autonomous component 443 in the present example) may be returned to the management component 240 via transaction 509b.

The new data template thus determined then may be sent back to the first autonomous component 441 via transaction 510, whereupon the new template may be entered in the appropriate template table in the rules database 445 with a unique ServerTemplateID. Subsequently, the new data template may be used by the first autonomous component 441 to generate a second data structure 223 for transmittal to the second system 120.

While the various embodiments described herein have been presented in the context of a provisioning system, it should be noted that the various embodiments may be implemented by and/or in conjunction with any system calling for the conversion of an instruction from a first format to a second format. Moreover, the various embodiments may be particularly suited to cases in which one or both of such instruction formats obey at least a three-layered structure of one or more operations, with each operation comprising a number of parameters and each parameter being defined in terms of values.

The various embodiments may assume the form of an entirely hardware embodiment, an entirely software embodiment, or an embodiment containing both hardware and software elements. In an exemplary embodiment, the various embodiments may be implemented in software, which includes but is not limited to firmware, resident software, microcode, etc.

Furthermore, the various embodiments may assume the form of a computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disc-read only memory (CD-ROM), compact disc-read/write (CD-R/W), DVD, and Blu-ray Disc (BD).

A data processing system suitable for storing and/or executing program code may comprise at least one processor coupled directly or indirectly to memory elements through a system bus. The memory elements may comprise local memory employed during actual execution of the program code, bulk storage, and cache memories. Such cache memories may provide temporary storage of at least some program code in order to reduce the number of times code must be retrieved from bulk storage during execution.

Input/output (I/O) devices (including but not limited to keyboards, displays, pointing devices, etc.) may be coupled to the system either directly or via intervening I/O controllers. Network adapters also may be coupled to the system to enable the data processing system to become coupled to other data processing systems or remote printers or storage devices through intervening private or public networks. Modems, cable modem, and Ethernet cards are among the currently available types of network adapters.

The invention claimed is:

1. A method for exchanging data among data processing systems, each of said data processing systems having a respective native data structure format, said method comprising:
    transmitting a first data structure from an originating system in the format native to said originating system to a management component;
    identifying a target system for receiving said first data structure;
    transmitting said first data structure from said management component to a first autonomous component as a function of said target system;
    comparing said first data structure to a set of data templates in order to identify a matching data template;
    if a matching data template is identified, generating a second data structure according to said matching data template, wherein said second data structure comprises data of said first data structure in the format native to said target system; and
    if no matching data template is identified, generating a new data template and generating said second data structure according to said new data template.

2. The method according to claim 1, further comprising transmitting said second data structure from said first autonomous component to said target system, wherein transmitting said second data structure from said first autonomous component to said target system comprises:

transmitting said second data structure to said management component; and transmitting said second data structure from said management component to said target system.

3. The method according to claim 1, wherein said new data template is generated via said first autonomous component using a plurality of rules to provide data for said target system.

4. The method according to claim 1, wherein said new data template is generated via a process involving a second autonomous component, said process comprising:

notifying said management component via said first autonomous component that said new template needs to be generated;

transmitting said first data structure from said management component to said second autonomous component;

generating said new data template via said second autonomous component using a plurality of rules to provide data for said target system; and transmitting said new data template from said second autonomous component to said first autonomous component.

5. The method according to claim 1, wherein said first data structure and said second data structure each define a plurality of operations, a plurality of parameters associated with each of said plurality of operations, and a plurality of parameter values associated with each of said plurality of parameters.

6. The method according to claim 5, further comprising:

mapping names of said plurality of operations defined in said first data structure to names of said plurality of operations defined in said second data structure; and mapping names of said plurality of parameters defined in said first data structure to names of said plurality of parameters defined in said second data structure.

7. The method according to claim 5, wherein generating said second data structure according to said matching data template comprises mapping said plurality of parameter values defined in said first data structure to said plurality of parameter values defined in said second data structure.

8. The method according to claim 5, wherein generating said second data structure according to said new data template comprises mapping said plurality of parameter values defined in said first data structure to said plurality of parameter values defined in said second data structure.

9. The method according to claim 1, wherein said target system is determined on the basis of a component of said first data structure.

10. The method according to claim 1, wherein said management component transmits said first data structure to a plurality of autonomous components in a predetermined sequence.

11. A non-transitory computer program product for exchanging data among data processing systems, each of said data processing systems having a respective native data structure format, said computer program product comprising a computer-readable storage medium having computer-readable program code instructions stored therein comprising:

a first set of computer instructions for transmitting a first data structure from an originating system in the format native to said originating system to a management component;

a second set of computer instructions for identifying a target system for receiving said first data structure;

a third set of computer instructions for transmitting said first data structure from said management component to a first autonomous component as a function of said target system;

a fourth set of computer instructions for comparing said first data structure to a set of data templates in order to identify a matching data template;

a fifth set of computer instructions for generating a second data structure according to said matching data template if a matching data template is identified, wherein said second data structure comprises data of said first data structure in the format native to said target system; and a sixth set of computer instructions for, if no matching data template is identified, generating a new data template and generating said second data structure according to said new data template.

12. The computer program product according to claim 11, wherein said first data structure and said second data structure each define a plurality of operations, a plurality of parameters associated with each of said plurality of operations, and a plurality of parameter values associated with each of said plurality of parameters.

13. The computer program product according to claim 12, wherein the computer-readable program code instructions further comprise:

a seventh set of computer instructions for mapping names of said plurality of operations defined in said first data structure to names of said plurality of operations defined in said second data structure; and an eighth set of computer instructions for mapping names of said plurality of parameters defined in said first data structure to names of said plurality of parameters defined in said second data structure.

14. The computer program product according to claim 12, wherein said fifth set of computer instructions comprises a ninth set of computer instructions for mapping said plurality of parameter values defined in said first data structure to said plurality of parameter values defined in said second data structure.

15. The computer program product according to claim 12, wherein said sixth set of computer instructions comprises a tenth set of computer instructions for mapping said plurality of parameter values defined in said first data structure to said plurality of parameter values defined in said second data structure.

16. A system for exchanging data among data processing systems, each of said data processing systems having a respective native data structure format, said system comprising:

a management system; and a first autonomous component, wherein said management system is configured for receiving a first data structure from an originating system in the format native to said originating system; identifying a target system for which said first data structure is destined; and transmitting said first data structure to said first autonomous component as a function of said target system, and wherein said first autonomous component is configured for comparing the first data structure to a set of data templates in order to identify a matching data template; if a matching data template is identified, generating a second data structure according to said matching template, wherein said second data structure comprises data of said first data structure in the format native to said target system; and if no matching data template is identified, generating a new data template and generating said second data structure according to said new data template.

17. The system according to claim 16, wherein said first autonomous component is further configured for transmitting said second data structure to said management component, and wherein said management component is further configured for transmitting said second data structure to said target system.

18. The system according to claim 16, further comprising a second autonomous component configured for generating said new data template and transmitting said new data template to said first autonomous component.

19. The system according to claim 16, wherein said first data structure and said second data structure each define a plurality of operations, a plurality of parameters associated with each of said plurality of operations, and a plurality of parameter values associated with each of said plurality of parameters.

20. The system according to claim 19, wherein said management component is further configured for mapping names of said plurality of operations defined in said first data structure to names of said plurality of operations defined in said second data structure, and mapping names of said plurality of parameters defined in said first data structure to names of said plurality of parameters defined in said second data structure.

21. The system according to claim 19, wherein said first autonomous component is configured for mapping said plurality of parameter values defined in said first data structure to said plurality of parameter values defined in said second data structure.

* * * * *